US008902942B2

(12) United States Patent
Fujita et al.

(10) Patent No.: US 8,902,942 B2
(45) Date of Patent: Dec. 2, 2014

(54) LASER APPARATUS AND BIO-IMAGING APPARATUS

(71) Applicant: Sony Corporation, Tokyo (JP)

(72) Inventors: Goro Fujita, Kanagawa (JP); Tsutomu Maruyama, Kanagawa (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/024,934

(22) Filed: Sep. 12, 2013

(65) Prior Publication Data

US 2014/0010059 A1      Jan. 9, 2014

Related U.S. Application Data

(63) Continuation of application No. 13/204,217, filed on Aug. 5, 2011, now Pat. No. 8,537,647.

(30) Foreign Application Priority Data

Aug. 20, 2010   (JP) ................................. 2010-184594

(51) Int. Cl.
*H01S 3/13*      (2006.01)
(Continued)

(52) U.S. Cl.
CPC ...... *G11B 7/00456* (2013.01); *G11B 20/10027* (2013.01); *G11B 20/10009* (2013.01);
(Continued)

(58) Field of Classification Search
CPC .......... G11B 20/10027; G11B 7/0045; G11B 20/10222; G11B 20/14; G11B 7/00456; G11B 7/126; G11B 7/127; H01S 5/0657; H01S 5/005; H01S 5/0064; H01S 5/0265; H01S 5/0601; H01S 5/0656; H01S 5/5036; H01S 5/0028; H01S 5/0085; H01S 5/0602; H01S 5/06246; H01S 5/141; H01S 5/22; H01S 5/4006

USPC ................. 372/18, 29.014, 29.01, 26, 38.02; 369/44.25, 44.28

See application file for complete search history.

(56) References Cited

U.S. PATENT DOCUMENTS 5,761,228 A * 6/1998 Yano ............................... 372/26
6,542,522 B1 * 4/2003 Arahira .......................... 372/18
(Continued)

FOREIGN PATENT DOCUMENTS

JP   HEI 08-340154   12/1996
JP   2002-341551     11/2002
(Continued)

OTHER PUBLICATIONS

Kobayashi, et al., "Introduction of volumetric optical storage technology" Micro-reflector, an ultra-multilayer optical disk, ISOM2009 Digest Th-1-01, 2009.

(Continued)

*Primary Examiner* — Colleen A Matthews
*Assistant Examiner* — Delma R Forde
(74) *Attorney, Agent, or Firm* — K&L Gates LLP

(57) ABSTRACT

A laser apparatus and bio-imaging apparatus are provided, which include: a mode-lock laser unit including a saturable absorber section that applies a bias voltage, a gain section that feeds a gain current, a semiconductor laser that emits laser light, and an external resonator; an optical modulation unit performing amplification modulation on the laser light emitted from the mode-lock laser unit; a reference signal generation unit generating a master clock signal and supplying a signal synchronized with the master clock signal to the gain section of the semiconductor laser; and a driving circuit generating a driving pulse used to drive the optical modulation unit based on the reference signal.

5 Claims, 7 Drawing Sheets

(51) Int. Cl.
*G11B 20/14* (2006.01)
*G11B 20/10* (2006.01)
*G11B 7/126* (2012.01)
*G11B 7/0045* (2006.01)

(52) U.S. Cl.
CPC .......... *G11B 20/14* (2013.01); *G11B 20/10222* (2013.01); *G11B 7/126* (2013.01); *G11B 7/0045* (2013.01)
USPC .............. 372/29.014; 372/18; 372/29.01; 372/26; 372/38.02; 369/44.25; 369/44.28

(56) References Cited

U.S. PATENT DOCUMENTS

| | | | |
|---|---|---|---|
| 7,103,079 B2* | 9/2006 | McInerney et al. | 372/38.02 |
| 8,416,671 B2* | 4/2013 | Fujita et al. | 369/116 |
| 8,537,647 B2* | 9/2013 | Fujita et al. | 369/44.25 |
| 2001/0046250 A1* | 11/2001 | Arbel et al. | 372/108 |
| 2002/0054617 A1* | 5/2002 | Tsuda et al. | 372/46 |
| 2004/0091009 A1* | 5/2004 | Matsuda et al. | 372/43 |
| 2006/0045145 A1* | 3/2006 | Arahira | 372/18 |
| 2006/0222024 A1* | 10/2006 | Gray et al. | 372/18 |
| 2009/0245043 A1* | 10/2009 | Ueda | 369/47.5 |
| 2011/0234744 A1* | 9/2011 | Fujita et al. | 347/248 |
| 2012/0044793 A1* | 2/2012 | Fujita et al. | 369/47.25 |
| 2012/0063288 A1* | 3/2012 | Fujita et al. | 369/116 |
| 2013/0021425 A1* | 1/2013 | Fujita et al. | 347/249 |
| 2013/0021887 A1* | 1/2013 | Fujita et al. | 369/59.11 |
| 2013/0021891 A1* | 1/2013 | Fujita et al. | 369/112.23 |
| 2013/0100789 A9* | 4/2013 | Fujita et al. | 369/47.25 |
| 2013/0235710 A1* | 9/2013 | Maruyama et al. | 369/47.28 |

FOREIGN PATENT DOCUMENTS

| | | |
|---|---|---|
| JP | 2009-049310 | 3/2009 |
| JP | 2009-238280 | 10/2009 |

OTHER PUBLICATIONS

"Sapphire Ultrafast Oscillators" Spectra-Physics Tsunami Series, 2008.

Kuramoto, et al. "Enormously high-peak power optical pulse generation from a single-transverse-mode GaInN blue-violet laser diode", American Institute of Physics, p. 96, 2010.

Koda, et al. "100 W peak-power 1 Ghz repetition picoseconds optical pulse generation using blue-violet GaInN diode laser mode-locked oscillator and optical amplifier", American Institute of Physics, p. 97, 2010.

Japanese Office Action issued Jan. 7, 2014 for corresponding Japanese Appln. No. 2010-184594.

Japanese Office Action issued Mar. 25, 2014 for corresponding Japanese Appln. No. 2010-184594.

* cited by examiner

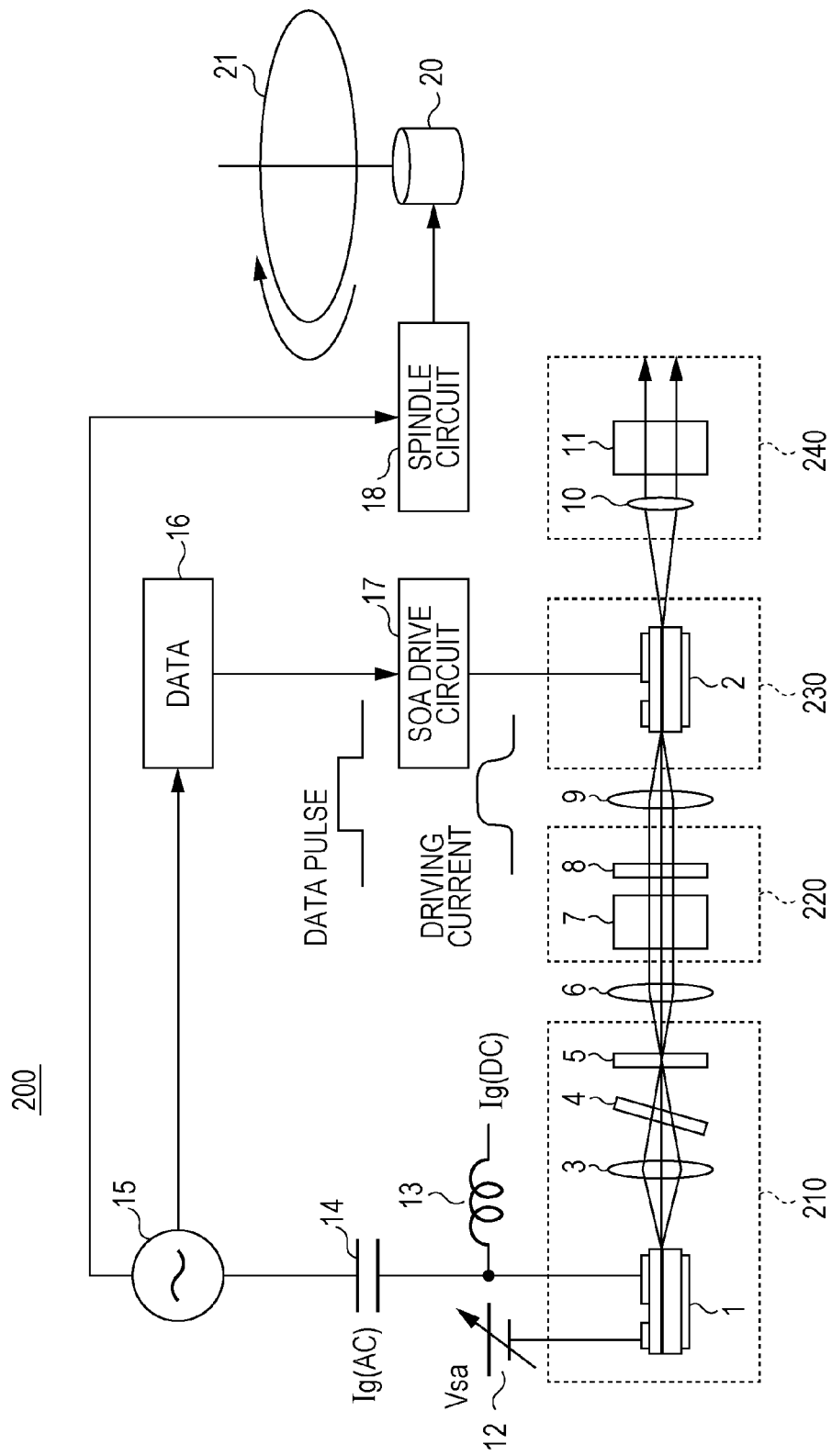

LASER APPARATUS AND BIO-IMAGING APPARATUS

CROSS REFERENCES TO RELATED APPLICATIONS

The present application is a continuation of U.S. application Ser. No. 13/204,217, filed Aug. 5, 2011, and which claims priority to Japanese Priority Patent Application JP 2010-184594 filed in the Japan Patent Office on Aug. 20, 2010, the entire contents of which are hereby incorporated by reference.

BACKGROUND

The present application relates to a recording apparatus that uses an MOPA (Master Oscillator Power Amplifier) in which a mode-lock oscillation type laser and an optical amplifier are combined as a recording optical source.

High-peak power laser light, particularly, ultra-short pulse light, is very effective for realizing the procedure of nonlinear multi-photon absorption.

This procedure of the nonlinear multi-photon absorption is expected to be applied to three-dimensional optical recording, ultra-fine processing, non-destructive bio-imaging, or the like.

For example, there has been reported a method of realizing multi-layer recording by emitting high-power laser light to a transparent bulk material having a nonlinear effect (see ISOM2009 Digest Th-1-01, 2009 by Seiji Kobayashi, Kimihiro Saito, Takashi Iwamura, Hisayuki Yamatsu, Toshihiro Horigome, Mitsuaki Oyamada, Kunihiko Hayashi, Daisuke Ueda, Norihiro Tanabe and Hirotaka Miyamoto).

According to this method, recording on a large-capacity recording medium can be realized more cheaply than a lamination type disc according to the related art.

A mode-lock type titanium-sapphire laser has been used as an optical source that outputs high-power laser light. Even in the example of ISOM2009 Digest Th-1-01, 2009 by Seiji Kobayashi, Kimihiro Saito, Takashi Iwamura, Hisayuki Yamatsu, Toshihiro Horigome, Mitsuaki Oyamada, Kunihiko Hayashi, Daisuke Ueda, Norihiro Tanabe and Hirotaka Miyamoto, emission light of a titanium-sapphire laser with 810 nm is converted into light with a 405 nm wavelength by an SHG (Second Harmonic Generator) and is used in a short-wavelength recording optical source advantageous for high-density recording.

Such a large expensive solid-state laser is limited to applications to experiments in laboratories (for example, see Spectra-Physics Inc. Online (searched in Aug. 6, 2010), Internet i_Series_Data_Sheet.pdf>).

For this reason, many researchers have tried to develop a small-sized and stable pulse optical source as a semiconductor base to put to practical use.

In the next-generation optical recording, as in the above-mentioned method, a blue-purple laser optical source advantageous for the high-density recording of all semiconductors is strongly preferred.

For example, in a gain switching type laser, it has been reported that when strongly excited driving is repeatedly performed at 1 MHz, the peak power of 55 W has been realized (see Appl. Phys. Lett. 96, 051102, 2010 by M. Kuramoto, T. Oki, T. Sugahara, S. Kono, M. Ikeda, and H. Yokoyama).

However, a higher repetition frequency is necessary even in a data recording optical source according to a request for a high data transmission rate in the market.

In recent years, it has been reported that an optical source of 100 W has been realized at a repetition frequency of 1 GHz by a blue laser effective for high-density recording (for example, see APPLIED PHYSICS LETTERS 97, 021101, 2010 by Rintaro Koda, Tomoyuki Oki, Takao Miyajima, Hideki Watanabe, Masaru Kuramoto, Masao Ikeda, and Hiroyuki Yokoyama).

This optical source has a configuration called an MOPA (Master Oscillator Power Amplifier) in which a semiconductor mode-lock laser and a semiconductor optical amplifier are combined.

A recording reproduction apparatus has to record data used in recording at an arbitrarily position based on a wobble signal read from an optical recording medium.

At this time, it is necessary to modulate the recording data in synchronization with an oscillation pulse.

SUMMARY

When the MOPA using the mode-lock oscillation type laser is applied to a recording reproduction apparatus, it is possible to modulate the recording data by outside driving of an optical amplifier which is a power amplifier.

However, since the optical oscillation frequency of the mode-lock oscillation type laser is generally determined as a unique frequency by the resonant length of a spatial resonator, the optical oscillation frequency is not synchronized with the outside driving of the optical amplifier. Even when the optical oscillation frequency matches with the frequency of a master clock of a recording system used for the outside driving by adjusting the resonant length, phase synchronization may not be achieved.

For this reason, the following problem may arise.

For example, it is supposed that the optical amplifier is driven with the master clock and a pulse for the recording data corresponding to a 5T mark is amplified. When the pulse light from the mode-lock oscillation type laser incident on the optical amplifier is synchronized with the driving of the optical amplifier in the optimum phase, a pulse signal is accurately generated.

However, when the pulse light incident on the optical amplifier is not synchronized with the master clock or the phase is not optimum, the pulse via the optical amplifier may become a signal corresponding to a 4T mark from the signal corresponding to the original 5T mark (see FIG. 5). For this reason, the signal may not be accurately generated.

It is desirable to provide a recording apparatus capable of easily obtaining synchronization of modulation of an optical pulse of laser light and the laser light with a simple configuration.

According to an embodiment, a recording apparatus is a recording apparatus that records information on an optical recording medium.

The recording apparatus includes a mode-lock laser unit including a saturable absorber section that applies a bias voltage, a gain section that feeds a gain current, a semiconductor laser that emits laser light used to record the information on the optical recording medium, and an external resonator.

The recording apparatus further includes an optical modulation unit performing amplification modulation on the laser light emitted from the mode-lock laser unit and a reference signal generation unit generating a master clock signal and supplying a signal synchronized with the master clock signal to the gain section of the semiconductor laser.

The recording apparatus further includes a recording signal generation unit generating a recoding signal based on the master clock signal and a driving circuit generating a driving pulse used to drive the optical modulation unit based on the recording signal.

In the recording apparatus according to the embodiment, the signal synchronized with the master clock signal is supplied from the reference signal generation unit to the gain section of the semiconductor laser. Thus, the optical pulse of the laser light emitted from the mode-lock laser unit including the semiconductor laser and the master clock signal can be synchronized with each other.

The recording signal generation unit generates the driving pulse based on the master clock signal and drives the optical modulation unit modulating the laser light based on the driving pulse. Thus, since the optical modulation unit is driven to be turned on or off in synchronization with the master clock signal, the laser light is modulated in synchronization with the master clock signal.

Due to the synchronization with the master clock signal, the optical pulse of the laser light and the modulation of the laser light can be synchronized with each other.

According to the above-described embodiment, since the optical pulse of the laser light and the modulation of the laser light can be synchronized with each other, the optical pulse of the laser light and the modulation of the laser light can easily be synchronized with each other even when the laser light has a very high pulse optical frequency.

Accordingly, the recording can be accurately realized with a high density and at a high speed.

Additional features and advantages are described herein, and will be apparent from the following Detailed Description and the figures.

BRIEF DESCRIPTION OF THE FIGURES

FIG. 1 is a schematic diagram illustrating the configuration of a recording apparatus according to a first embodiment;

DETAILED DESCRIPTION

Figure 2A:
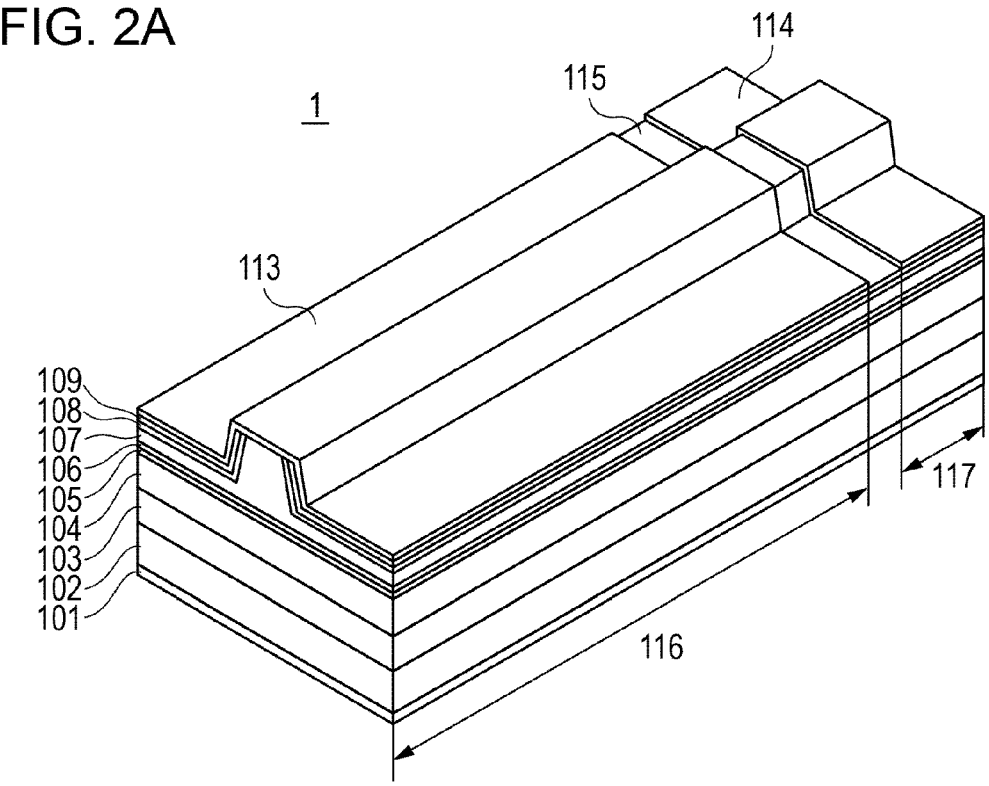
FIGS. 2A and 2B are schematic diagrams illustrating an example of a semiconductor laser in FIG. 1.

Embodiments of the present application will be described below in detail with reference to the drawings.

The description thereof will be made in the following order.

1. First Embodiment
2. Second Embodiment
3. Third Embodiment

1. First Embodiment

FIG. 1 is a schematic diagram illustrating the configuration of a recording apparatus according to a first embodiment.

A recoding apparatus 200 shown in FIG. 1 includes a mode-lock laser unit 210, an optical isolator unit 220, an optical amplifier unit (SOA unit) 230, and a beam shaping unit 240.

The recording apparatus 200 further includes a bias Tee formed by a variable voltage source 12, a coil 13, and a capacitor 14, a reference signal generation unit 15, a data generation unit (recording signal generation unit) 16, an SOA drive circuit 17, a spindle circuit 18, and a spindle motor 20.

Further, the recording apparatus 200 includes various kinds of circuits or various kinds of optical components (none of which are shown).

The mode-lock laser unit 210 includes a semiconductor laser 1 and optical components such as a lens 3, a band-pass filter 4, and a minor 5 passing through laser light emitted from the semiconductor laser 1. The band-pass filter 4 passes through light with a given wavelength range and does not pass through light with a wavelength out of the wavelength range.

An external resonator (spatial resonator) is disposed between a minor of the rear end surface of the semiconductor laser 1 and the mirror 5. The frequency of the laser light emitted from the mode-lock laser unit 210 is determined in accordance with the path length of the external resonator. Thus, since the frequency of the laser light can be forcibly locked to a specific frequency, the mode of the laser light can be locked.

Figure 2B:
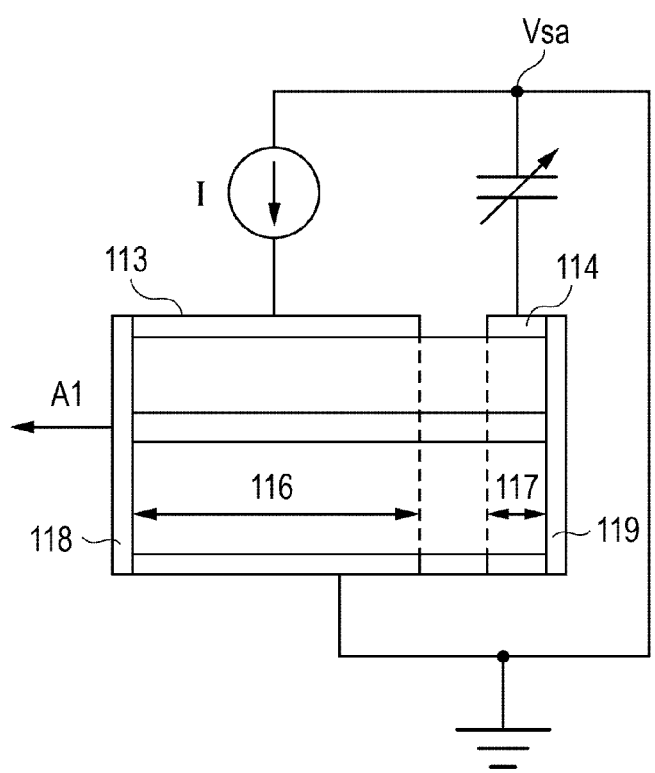

An exemplary configuration of the semiconductor laser 1 shown in FIG. 1 is schematically illustrated in FIGS. 2A and 2B. FIG. 2A is a perspective view of the semiconductor laser and FIG. 2B is a schematic view of the laser light emitted from the semiconductor laser.

The semiconductor laser 1 includes a gain section 116 and a saturable absorber section 117, as shown in FIGS. 2A and 2B. That is, the semiconductor laser 1 is a BS (bisectional) type semiconductor laser.

When the saturable absorber section 117 is provided, an absorption rate is lowered with an increase in the intensity of light incident on the absorber section. Accordingly, since only a pulse with a large intensity can be transmitted, a narrower pulse can be obtained.

Further, a gain current is fed to the gain section 116.

An n-type GaN layer 103, an n-type clad layer 104, an active layer 105, a p-type electron barrier layer 106, and a p-type clad layer 107 are laminated on an n-type GaN substrate 102.

As shown in FIG. 2A, a ridge structure is formed in the middle of the p-type clad layer 107. A SiO2 layer 108 and a Si layer 109 are formed on the ridge side surfaces or a portion where the ridge structure of the p-type clad layer 107 is not formed.

On the p-type clad layer 107 and the Si layer 109, p-type electrodes 113 and 114 are formed by an ohmic contact.

That is, a main electrode 113 is formed on the gain section 116 and a sub-electrode 114 is formed on the saturable absorber section 117. Since the electrodes 113 and 114 are separated by a separation section 115 formed with a groove with a width of, for example, 20 μm, the electrodes 113 and 114 are electrically isolated from each other. The lengths of the main electrode 113 and the sub-electrode 114 are, for example, 520 μm and 60 μm, respectively.

A lower electrode 101 is formed by an ohmic contact on the lower surface of the n-type GaN substrate 102.

An anti-reflection film (see FIG. 2B) 118 is coated on the cleaved plane of the front surface of the gain section 116. A high reflection film 119 (see FIG. 2B) is coated on the cleaved plane of the rear surface of the saturable absorber section 117.

In the semiconductor laser 1, as shown in FIG. 2B, a reverse bias voltage Vsa is applied to the saturable absorber section 117 by the sub-electrode 114. At this time, by feeding a current I from the main electrode 113 to the gain section 116, the laser light is emitted in a direction indicated by an arrow A1.

In the recording apparatus 200 according to this embodiment, the configuration of the used semiconductor laser 1 is not limited to the configuration of the semiconductor laser 1 shown in FIGS. 2A and 2B, but a semiconductor laser with another configuration can be used.

The semiconductor material of the semiconductor laser 1 is selected depending on the wavelength of the laser light used for recording information in the recording apparatus 200.

The optical isolator unit 220 is disposed on the rear stage of the mode-lock laser unit 210 with a lens 6 interposed therebetween.

The optical isolator unit 220 includes an optical isolator 7 and a mirror 8.

The optical isolator 7 has a function of preventing light reflected from optical components or the like on the rear stage from being incident on the semiconductor laser 1.

The optical amplifier unit (SOA unit) 230 serves as an optical modulation unit that performs amplification modulation on the laser light emitted from the semiconductor laser 1. The optical amplifier unit 230 is disposed on the rear stage of the optical isolator unit 220 with a lens 9 interposed therebetween.

The optical amplifier unit (SOA unit) 230 is configured by an SOA (Semiconductor Optical Amp), that is, a semiconductor optical amplifier 2.

The semiconductor optical amplifier 2 is a small-sized and cheap optical amplifier and can be used as an optical gate or a light switch that turns light on or off.

In this embodiment, the laser light emitted from the semiconductor laser 1 is modulated when the semiconductor optical amplifier 2 is turned on or off.

Figure 3:
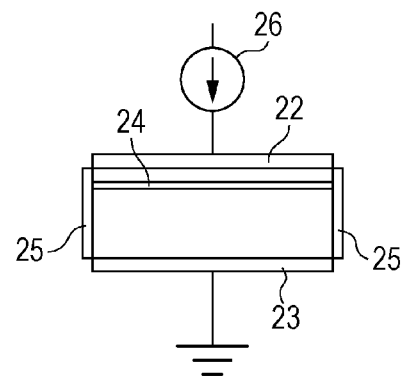
FIG. 3 is a schematic diagram illustrating an example of a semiconductor optical amplifier in FIG. 1.

An exemplary configuration of the semiconductor optical amplifier 2 shown in FIG. 1 is schematically illustrated in FIG. 3.

In a general semiconductor laser, light is confined in a resonator that is configured by minors on the both end surfaces and laser light is oscillated by optical gain due to interband transition.

Meanwhile, as shown in FIG. 3, instead of the mirrors, anti-reflection films 25 are disposed on the both end surfaces of the semiconductor optical amplifier 2 to suppress the oscillation of the laser light, so that the semiconductor optical amplifier 2 is operated as an amplifier corresponding to one pass.

In the semiconductor optical amplifier 2, a semiconductor layer including an active layer 24 is configured to be laminated, as in the semiconductor laser.

In the semiconductor optical amplifier 2, an upper electrode 22 is formed on the upper surface and a lower electrode 23 is formed on the lower surface. The upper electrode 22 is connected to a current source 26 and the lower electrode 23 is connected to a ground potential.

When a driving current is fed from the current source 26 to the upper electrode 22 and the laser light is incident from the incident end surface on which the anti-reflection film 25 is formed, the laser light is amplified by induced emission during wave-guiding of the laser light in the active layer 24.

By controlling the amount of driving current fed to the semiconductor optical amplifier 2, the amplification amount of the laser light can be controlled.

However, the laser light incident to the semiconductor optical amplifier 2 may not be necessarily amplified. When a sufficient laser light power can be obtained, the gain of the semiconductor optical amplifier 2 may be set to 1.

Figure 4A:
FIGS. 4A and 4B are diagram illustrating input light and output light of the semiconductor optical amplifier in FIG. 1.
Figure 4B:

In the semiconductor optical amplifier 2 with the above-described configuration, since a carrier lifespan is short, high-speed response is made for a variation in the current or the optical intensity. Accordingly, as for continuous pulse light input from the semiconductor laser 1, as shown in FIG. 4A, for example, pulse light with a waveform shown in FIG. 4B can be obtained as light output from the semiconductor optical amplifier 2.

That is, since ON and OFF can be controlled by the signal of the driving current, the semiconductor optical amplifier 2 can be used as a switch of high-speed light so as to correspond to even the pulse light frequency of the semiconductor laser 1.

When the recording apparatus 200 has a configuration in which laser light with, for example, a 407 nm wavelength is emitted from the semiconductor laser 1, the semiconductor optical amplifier 2 is also made of the same material as that of a blue-purple semiconductor laser that emits light with the same wavelength as that of the active layer 24, a guide layer, a clad layer, or the like.

The beam shaping unit 240 is disposed on the rear stage of the optical amplifier unit 230.

The beam shaping unit 240 includes a lens 10 and a prism (for example, an anamorphic prism) 11 that shapes the beam of the laser light.

The laser light shaped by the beam shaping unit 240 is emitted to an optical recording medium 21 via an optical pickup (not shown).

The variable voltage source 12 supplies the bias voltage Vsa to the sub-electrode 114 of the saturable absorber section 117 of the semiconductor laser 1 of the mode-lock laser unit 210.

The bias Tee configured by the coil 13 and the capacitor 14 supplies a gain current Ig to the main electrode 113 of the gain section 116 of the semiconductor laser 1 of the mode-lock laser unit 210. An AC component and a DC component of the gain current Ig are supplied from the reference signal generation unit 15 to the capacitor 14 and the coil 13, respectively.

The reference signal generation unit 15 generates the master clock signal. The master clock signal generated by the reference signal generation unit 15 is transmitted to the data generation unit (recording signal generation unit) 16.

The reference signal generation unit 15 supplies, to the capacitor 14 of the bias Tee, a signal synchronized with the master clock signal as the AC component of the gain current Ig for the semiconductor laser 1.

The data generation unit (recording signal generation unit) 16 generates a data pulse by loading recording data in synchronization with the master clock signal. The generated data pulse is transmitted to the SOA drive circuit 17.

The SOA drive circuit 17 generates a driving current of the semiconductor optical amplifier (SOA) 2 based on the data pulse. The driving current is supplied to the semiconductor optical amplifier 2 of the optical amplifier unit (SOA unit) 230.

The signal synchronized with the master clock signal is transmitted from the reference signal generation unit 15 to the spindle circuit 18.

The driving current is supplied from the spindle circuit 18 to the spindle motor 20, so that the rotation speed of the disc-shaped optical recording medium 21 is controlled by the driving current of the spindle motor 20.

The signal synchronized with the master clock signal is supplied as the AC component of the gain current Ig for the semiconductor laser 1, the optical pulse of the laser light emitted from the semiconductor laser 1 can be synchronized with the master clock signal.

Further, since the driving current of the semiconductor optical amplifier (SOA) 2 is generated based on the data pulse generated by loading the recording data in synchronization with the master clock signal, the semiconductor optical amplifier 2 is driven in synchronization with the master clock signal. In this way, the modulation (ON or OFF) of the laser light by the semiconductor optical amplifier 2 can be synchronized with the master clock signal.

Furthermore, since the signal synchronized with the master clock signal is transmitted to the spindle circuit 18 that supplies the driving current to the spindle motor 20, the rotation driving of the optical recording medium by the spindle motor 20 can be synchronized with the master clock signal.

In the recording apparatus 200 according to the above-described embodiment, the reference signal generation unit 15 supplies the signal synchronized with the master clock signal to the gain section 116 of the semiconductor laser 1. Thus, the optical pulse of the laser light emitted from the semiconductor laser 1 can be synchronized with the master clock signal.

The data generation unit 16 generates the data pulse by loading the recording data based on the master clock signal and the SOA drive circuit 17 generates the current pulse of the driving current of the semiconductor optical amplifier 2 based on the data pulse.

Since the semiconductor optical amplifier 2 is driven by the current pulse of the driving current, the semiconductor optical amplifier 2 is driven to be turned on or off in synchronization with the master clock signal, so that the laser light is modulated in synchronization with the master clock signal.

Due to the synchronization with the master clock signal, the optical pulse of the laser light and the modulation of the laser light can be synchronized with each other.

Thus, since the optical pulse of the laser light and the modulation of the laser light can be synchronized with each other, the optical pulse of the laser light and the modulation of the laser light can easily be synchronized with each other even when the laser light has a very high pulse optical frequency.

Accordingly, in the recording apparatus, the recording can be accurately realized with a high density and at a high speed.

Due to the synchronization with the master clock signal, the modulation of the laser light by the semiconductor optical amplifier 2 and the rotation of the optical recording medium 21 can be synchronized with each other.

Thus, since information can be recorded with an appropriate density at a desired position on the disc-shaped optical recording medium 21, the recording can be accurately realized with a high density and at a high speed.

2. Second Embodiment

However, even when the oscillation pulse of the semiconductor laser 1 and the data pulse are synchronized with each other, the amplitude of the output light may become unstable due to the change in the time axis in the rising point and the falling point of the pulse of the driving current of the semiconductor optical amplifier 2.

Figure 5A:
FIGS. 5A to 5D are diagrams illustrating a problem at a rising point/falling point of a driving pulse of the semiconductor optical amplifier.
Figure 5B:
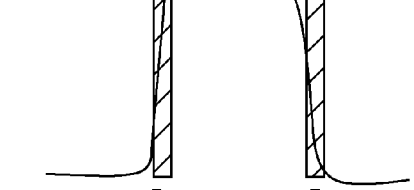

That is, the amount of current is considerably changed in transition regions (a portion indicated by diagonal lines) near the rising point and the falling point of the pulse of the driving current of the semiconductor optical amplifier 2 shown in FIG. 5B, which is generated based on the data pulse shown in FIG. 5A. Therefore, the current amount is not sufficient.

Figure 5C:
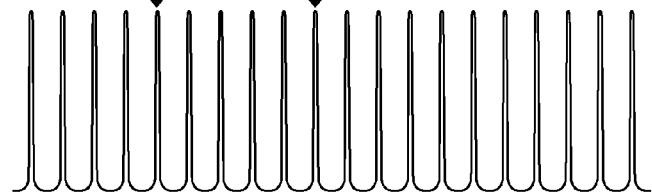
Figure 5D:
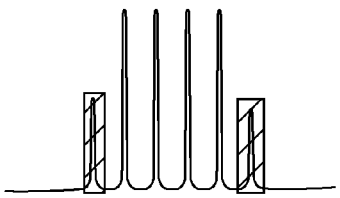

For this reason, in output light obtained from input light shown in FIG. 5C, as shown in FIG. 5D, its amplitude of the portions (portions indicated by diagonal lines) corresponding to the transition regions near the rising point and the falling point of the pulse of the driving current of the semiconductor optical amplifier 2 may decrease.

An embodiment of a recording apparatus configured to resolve such a problem will be described below.

Figure 6:
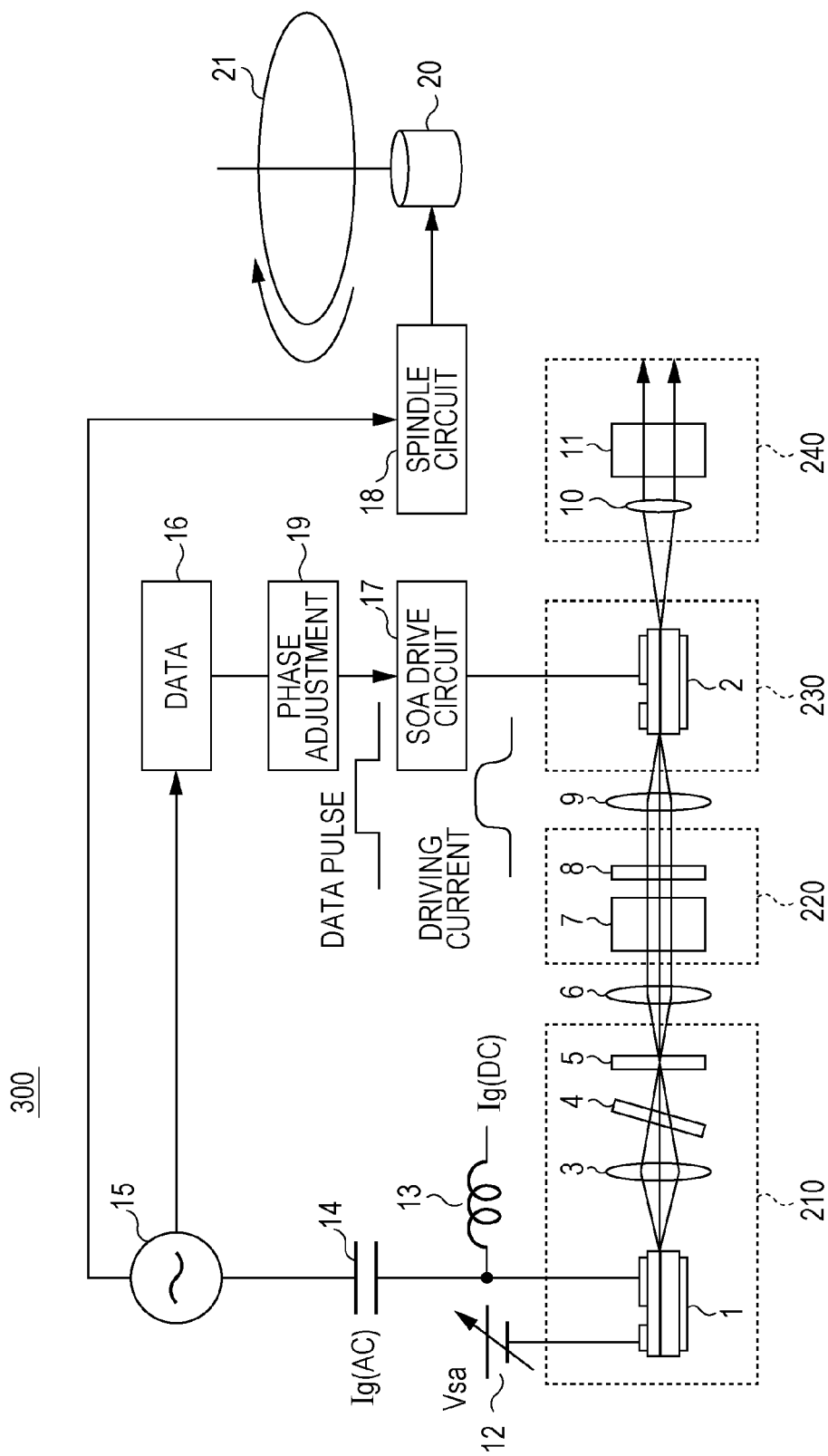
FIG. 6 is a schematic diagram illustrating the configuration of a recording apparatus according to a second embodiment.

The configuration of the recording apparatus according to a second embodiment is schematically illustrated in FIG. 6.

A recording apparatus 300 shown in FIG. 6 includes a phase adjustment circuit 19 disposed between the data generation unit (the recording signal generation unit) 16 and the SOA drive circuit 17.

The phase adjustment circuit 19 adjusts the phase of the data pulse generated by the data generation unit (the recording signal generation unit) 16 and then supplies the data pulse to the SOA drive circuit 17.

Thus, the influence of the rising point and the falling point of the pulse of the driving current of the semiconductor optical amplifier 2 on the output light is reduced.

Figures 7A, 7B, 7C, 7D, 7E, 8:
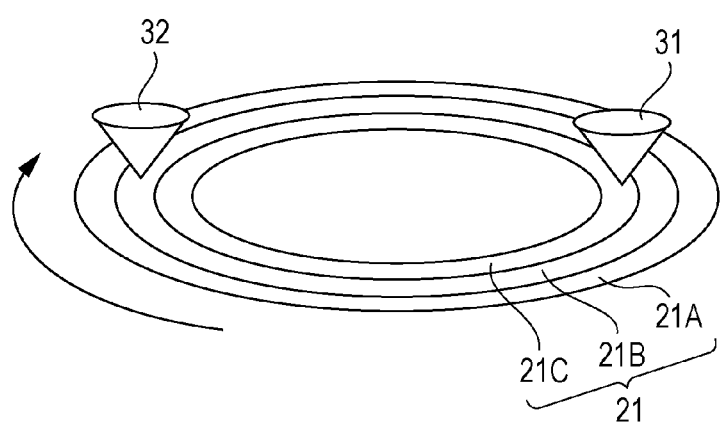
FIGS. 7A to 7E are diagrams illustrating phase adjustment performed by a phase adjustment circuit in FIG. 6.
FIG. 8 is a diagram illustrating a case where zoning is performed in an optical recording medium.

The adjustment of the phase of the driving current by the phase adjustment circuit 19 will be described with reference to FIGS. 7A to 7D. A data pulse shown in FIG. 7A is adjusted by the phase adjustment circuit 19 so as to be shifted backward by a period corresponding to a part of the pulse width, as shown in FIG. 7B. The data pulse is preferably shifted by about the half of a period of laser light input to the semiconductor optical amplifier 2 shown in FIG. 7D.

Thus, in the vicinity (transition regions) of the rising point and the falling point of the pulse of the SOA driving current shown in FIG. 7C, the intensity of the light input to the semiconductor optical amplifier 2 shown in FIG. 7D decreases.

Accordingly, as the waveform of the light output from the semiconductor optical amplifier 2 is shown in FIG. 7E, the optical pulse with sufficient amplitude can be obtained from the output light without the influence of the rising point and the falling point of the driving pulse on the output light.

The remaining configuration of the recording apparatus 300 shown in FIG. 6 is the same as that of the recording apparatus 200 shown in FIG. 1 according to the first embodiment. The same reference numerals are given and the description thereof will not be repeated.

In the recording apparatus 300 according to the above-described second embodiment, the optical pulse of the laser light and the modulation of the laser light can easily be synchronized with each other, as in the recording apparatus 200 according to the first embodiment.

Thus, the optical pulse of the laser light and the modulation of the laser light can be synchronized with each other, even when the laser light has a very high pulse optical frequency.

Accordingly, in the recording apparatus, the recording can be accurately realized with a high density and at a high speed.

As in the recording apparatus 200 according to the first embodiment, the modulation of the laser light by the semiconductor optical amplifier 2 and the rotation of the optical recording medium 21 can be synchronized with each other.

Thus, since information can be recorded with an appropriate density at a desired position on the disc-shaped optical recording medium 21, the recording can be accurately realized with a high density and at a high speed.

In the recording apparatus 300 according to the second embodiment, the phase adjustment circuit 19 is provided between the data generation unit 16 and the SOA drive circuit 17. The phase adjustment circuit 19 adjusts the phase of the data pulse generated by the data generation unit 16 and then supplies the data pulse to the SOA drive circuit 17.

Further, the phase adjustment circuit 19 adjusts the phase of the recording signal so as to prevent the light emission pulse of the laser light from overlapping with the rise and fall transition regions of the driving pulse of the semiconductor optical amplifier 2. Thus, since the influence of the transition regions of the driving pulse on the modulated laser light can be eliminated, it is possible to obtain the optical pulse with sufficient amplitude.

3. Third Embodiment

As a method of improving the transmission rate of the optical recording medium, there is a method of providing a plurality of optical pickups and configuring a plurality of laser beams to be emitted to the optical recording medium in order to increase data channels.

For example, the recording region of the optical recording medium is divided into several zones (zoning) and assigning the zones to the plurality of optical pickups.

A case where the zoning is performed on the optical recoding medium 21 is shown in FIG. 8.

As shown in FIG. 8, the optical recording medium 21 is divided into the plurality of zones 21A, 21B, and 21C with a doughnut shape in a radius range from the center of the optical recording medium 21 and assigning the zones 21A, 21B, and 21C to two optical pickups 31 and 32.

With such a configuration, when the rotation number of the optical recording medium 21 is set to be constant, it is necessary to set each clock of the inner circumference and the outer circumference of each zone of the optical recording medium 21, so that the recording density is constant, in order to realize a linear density in all the zones.

For example, when the frequency of the master clock is 1713.60 MHz, the minimum clock density is 66 nm/clock, and the rotation number of the optical recording medium is 3600 rpm, a setting example of each clock of the inner circumference and the outer circumference of each zone is shown in Table 1. In Table 1, R denotes a radius from the center, Zone denotes a zone number, V1 denotes a linear velocity, Clk denotes a clock frequency, Inner denotes the clock density of the inner circumference of the zone, and Outer denotes the clock density of the outer circumference of the zone. Further, Ratio denotes a ratio at which the frequency of the master clock is eliminated by the clock frequency of each zone.

TABLE 1

| R (mm) | Zone | V1 (m/s) | Clk (MHz) | Inner | Outer | Ratio |
|---|---|---|---|---|---|---|
| 30 | 0 | 11.31 | 171.36 | 66.00 | 70.40 | 10.00 |
| 32 | 1 | 12.06 | 182.78 | 66.00 | 70.13 | 9.38 |
| 34 | 2 | 12.82 | 194.21 | 66.00 | 69.88 | 8.82 |
| 36 | 3 | 13.57 | 205.63 | 66.00 | 69.67 | 8.33 |
| 38 | 4 | 14.33 | 217.06 | 66.00 | 69.47 | 7.89 |
| 40 | 5 | 15.08 | 228.48 | 66.00 | 69.30 | 7.50 |
| 42 | 6 | 15.83 | 239.90 | 66.00 | 69.14 | 7.14 |
| 44 | 7 | 16.59 | 251.33 | 66.00 | 69.00 | 6.82 |
| 46 | 8 | 17.34 | 262.75 | 66.00 | 68.87 | 6.52 |
| 48 | 9 | 18.10 | 274.18 | 66.00 | 68.75 | 6.25 |

TABLE 1-continued

| R (mm) | Zone | V1 (m/s) | Clk (MHz) | Inner | Outer | Ratio |
|---|---|---|---|---|---|---|
| 50 | 10 | 18.85 | 285.60 | 66.00 | 68.64 | 6.00 |
| 52 | 11 | 19.60 | 297.02 | 66.00 | 68.54 | 5.77 |
| 54 | 12 | 20.36 | 308.45 | 66.00 | 68.44 | 5.56 |
| 56 | 13 | 21.11 | 319.87 | 66.00 | 68.36 | 5.36 |
| 58 | 14 | 21.87 | 331.30 | 66.00 | 68.28 | 5.17 |
| 60 | 15 | 22.62 | 342.72 | 66.00 | 68.20 | 5.00 |

When the clock Clk of each zone is set, as in Table 1, the clock density of the inner circumference of each zone is constantly set to 66 (nm/clock) and the recording density of the inner circumference where the recording density is the highest in the zone can be made to be constant.

In a case of the MOPA optical source using the mode-lock laser, the clock frequency is determined by the length of a resonator of the mode-lock laser. Accordingly, as in the example shown in Table 1, it is difficult to minutely optimize the clock frequency of each zone.

In order to resolve this problem, the clock frequency of each zone is set at an integer ratio so as to be easily generated from the same master clock by signal processing or the like.

Further, the clock frequency of each zone is set at an integer ratio within a range in which the recording density of the zone does not exceed the limit so that the clock frequency is slightly high.

A setting example in which the clock frequency is set in this manner is shown in Table 2.

TABLE 2

| R (mm) | Zone | V1 (m/s) | Integer Ratio | Clk (MHz) | Inner | Outer |
|---|---|---|---|---|---|---|
| 30 | 0 | 11.31 | 10 | 171.36 | 66.00 | 70.40 |
| 32 | 1 | 12.06 | 10 | 171.36 | 70.40 | 74.80 |
| 34 | 2 | 12.82 | 9 | 190.40 | 67.32 | 71.28 |
| 36 | 3 | 13.57 | 9 | 190.40 | 71.28 | 75.24 |
| 38 | 4 | 14.33 | 8 | 214.20 | 66.88 | 70.40 |
| 40 | 5 | 15.08 | 8 | 214.20 | 70.40 | 73.92 |
| 42 | 6 | 15.83 | 8 | 214.20 | 73.92 | 77.44 |
| 44 | 7 | 16.59 | 7 | 244.80 | 67.76 | 70.84 |
| 46 | 8 | 17.34 | 7 | 244.80 | 70.84 | 73.92 |
| 48 | 9 | 18.10 | 7 | 244.80 | 73.92 | 77.00 |
| 50 | 10 | 18.85 | 6 | 285.60 | 66.00 | 68.64 |
| 52 | 11 | 19.60 | 6 | 285.60 | 68.64 | 71.28 |
| 54 | 12 | 20.36 | 6 | 285.60 | 71.28 | 73.92 |
| 56 | 13 | 21.11 | 6 | 285.60 | 73.92 | 76.56 |
| 58 | 14 | 21.87 | 6 | 285.60 | 76.56 | 79.20 |
| 60 | 15 | 22.62 | 5 | 342.72 | 66.00 | 68.20 |

In the example shown in Table 2, the zones of the optical recording medium 21 are set by integers and the clock frequency of each zone is set at an integer ratio. That is, on the assumption that the integer ratios are n (integers from 5 to 10), a relationship of "the clock frequency=1713.6/n" is satisfied.

Thus, when the clock frequency is set at the integer ratio, the clock frequency can easily be generated from the same master clock by signal processing or the like.

Figure 9:
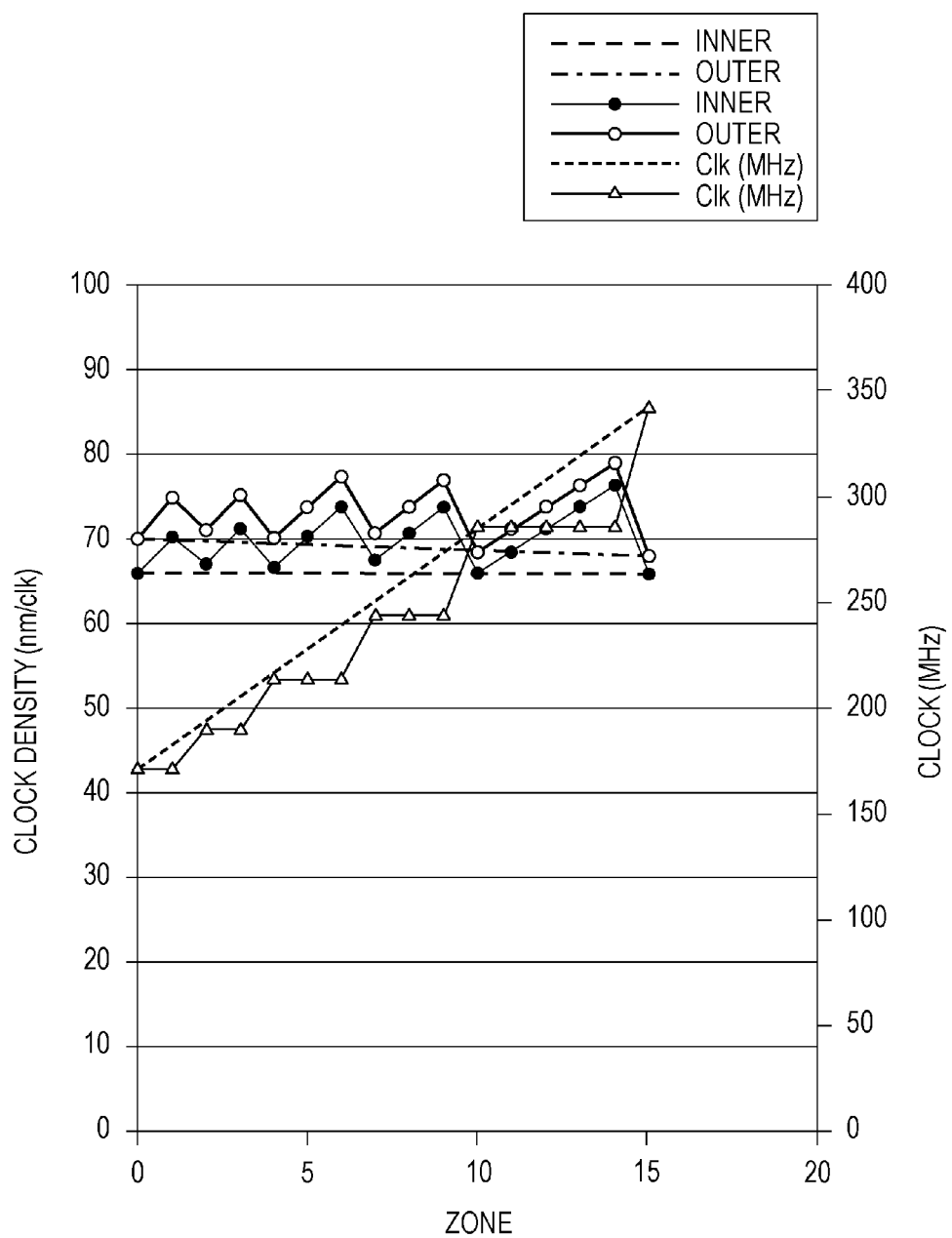
FIG. 9 is a diagram illustrating a relationship between a clock frequency and a clock density of each zone in an example of Table 1 and an example of Table 2.

The clocks and the clock densities are compared in the inner circumference and the outer circumference of the zone in the examples of Table 1 and Table 2 and the result is shown in FIG. 9. In FIG. 9 a dashed line indicates the case of Table 1 and polygonal lines indicated by signs •, O, and Δ indicate the case of the Table 2.

An embodiment of a recording apparatus with such a configuration will be described below.

Figure 10:
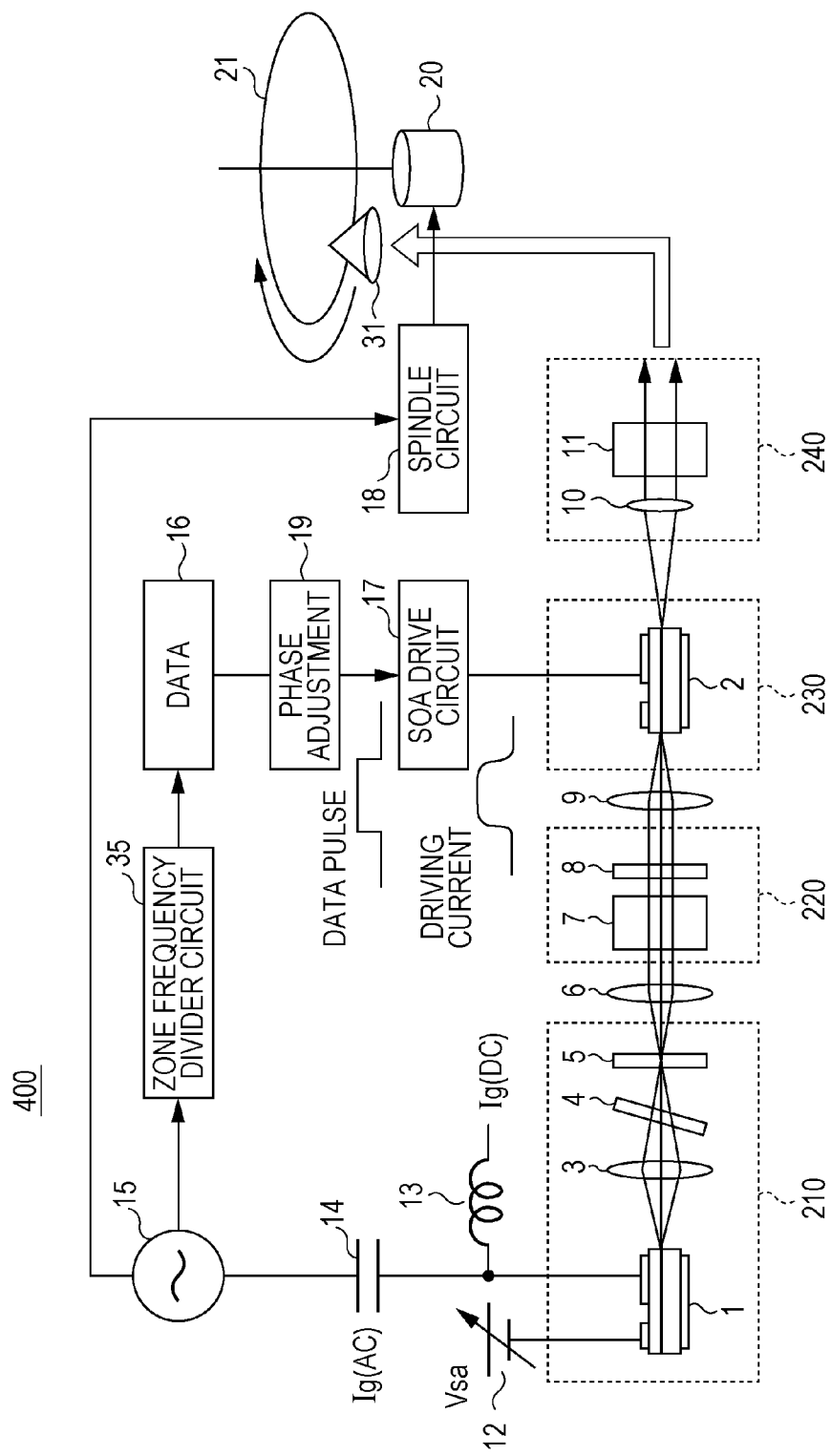
FIG. 10 is a schematic diagram illustrating the configuration of a recording apparatus according to a third embodiment.

The configuration of a recording apparatus according to a third embodiment is shown in FIG. 10.

A recording apparatus 400 shown in FIG. 10 includes a zone frequency-divider circuit 35 disposed between the reference signal generation unit 15 and the data generation unit (the recording signal generation unit) 16.

The zone frequency-divider circuit 35 generates a clock signal of each zone of the optical recording medium 21 having the relationship of an integer ratio between the frequency of the master clock signal and the frequency of the clock signal using the master clock signal generated by the reference signal generation unit 15. Then, the clock signal of each zone generated by the zone frequency-divider circuit 35 is supplied to the data generation unit (the recording signal generation unit) 16.

The clock signal of each zone generated in this way is reflected on the data pulse or the driving current of the semiconductor optical amplifier (SOA) 2. When the semiconductor optical amplifier 2 is turned on or off, the laser light from the semiconductor laser 1 is supplied to the optical pickup 31 in synchronization with the clock signal of each zone. Thus, information can be recorded at an appropriate clock in each zone of the optical recording medium 21.

In FIG. 10, only one optical pickup 31 is illustrated. However, as shown in FIG. 8, the plurality of optical pickups 31 and 32 are assigned to the zones.

The remaining configuration of the recording apparatus 400 shown in FIG. 10 is the same as that of the recording apparatus 300 shown in FIG. 6 according to the second embodiment. The same reference numerals are given and the description thereof will not be repeated.

In the recording apparatus 400 according to the above-described third embodiment, the optical pulse of the laser light and the modulation of the laser light can easily be synchronized with each other, as in the recording apparatuses 200 and 300 according to the first and second embodiments.

Thus, the optical pulse of the laser light and the modulation of the laser light can be synchronized with each other, even when the laser light has a very high pulse optical frequency.

Accordingly, in the recording apparatus, the recording can be accurately realized with a high density and at a high speed.

As in the recording apparatuses 200 and 300 according to the first and second embodiments, the modulation of the laser light by the semiconductor optical amplifier 2 and the rotation of the optical recording medium 21 can be synchronized with each other.

Thus, since information can be recorded with an appropriate density at a desired position on the disc-shaped optical recording medium 21, the recording can be accurately realized with a high density and at a high speed.

As in the recording apparatus 300 according to the second embodiment, the phase adjustment circuit 19 adjusts the phase of the recording signal so as to prevent the light emission pulse of the laser light from overlapping with the rise and fall transition regions of the driving pulse of the semiconductor optical amplifier 2.

Thus, since the influence of the transition regions of the driving pulse on the modulated laser light can be eliminated, it is possible to obtain the optical pulse with a sufficient amplitude.

Further, in the recording apparatus 400 according to the third embodiment, the zone frequency-divider circuit 35 is disposed between the reference signal generation unit 15 and the data generation unit 16. The zone frequency-divider circuit 35 generates the clock signal of each zone of the optical recording medium 21 having the relationship of the integer ratio between the frequency of the master clock signal and the frequency of the clock signal.

Accordingly, the clock signal of each zone can easily be generated. Therefore, even when the mode-lock oscillation type laser is used as an optical source, the same linear density can be set in the respective zones under the constant rotation number of the optical recording medium 21 by setting the recording density of each zone to be as high as possible.

In the above-described third embodiment, the zone frequency-divider circuit 35 is further provided in the configuration of the second embodiment in which the phase adjustment circuit 19 is included. The zone frequency-divider circuit may be provided in the configuration of the first embodiment in which no phase adjustment circuit is included.

In the recording apparatus according to each embodiment described embodiment, the optical recording medium 21 to be used has a dick shape and information is recorded by rotating the optical recording medium 21 by the spindle motor 20. However, the embodiments are applicable to a recording apparatus with other configurations.

For example, information may be recorded in an optical recording medium with a card shape by scanning laser light to the optical recording medium.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A laser apparatus comprising:
a mode-lock laser unit including a saturable absorber section that applies a bias voltage, a gain section that feeds a gain current, a semiconductor laser that emits laser light, and an external resonator;
an optical modulation unit performing amplification modulation on the laser light emitted from the mode-lock laser unit;
a reference signal generation unit generating a master clock signal and supplying a signal synchronized with the master clock signal to the gain section of the semiconductor laser such that an optical pulse of the laser light emitted from the semiconductor laser is synchronized with the master clock signal; and
a driving circuit generating a driving pulse used to drive the optical modulation unit based on the reference signal.

2. The laser apparatus according to claim 1, further comprising:
a phase adjustment circuit that is disposed between the reference signal generation unit and the driving circuit and adjusts a phase of the reference signal so as to prevent a light emission pulse of the laser light from overlapping with rise and fall transition regions of the driving pulse.

3. A bio-imaging apparatus comprising:
a laser including:
a mode-lock laser unit including a saturable absorber section that applies a bias voltage, a gain section that feeds a gain current, a semiconductor laser that emits laser light, and an external resonator;
an optical modulation unit performing amplification modulation on the laser light emitted from the mode-lock laser unit;
a reference signal generation unit generating a master clock signal and supplying a signal synchronized with the master clock signal to the gain section of the semiconductor laser such that an optical pulse of the laser light emitted from the semiconductor laser is synchronized with the master clock signal; and a driving circuit generating a driving pulse used to drive the optical modulation unit based on the reference signal.

4. The bio-imaging apparatus according to claim 3, wherein the laser includes a phase adjustment circuit that is disposed between the reference signal generation unit and the driving circuit and adjusts a phase of the reference signal so as to prevent a light emission pulse of the laser light from overlapping with rise and fall transition regions of the driving pulse.

5. The bio-imaging apparatus according to claim 3, wherein the laser is configured for non-destructive bio-imaging.

* * * * *